Patented July 28, 1931

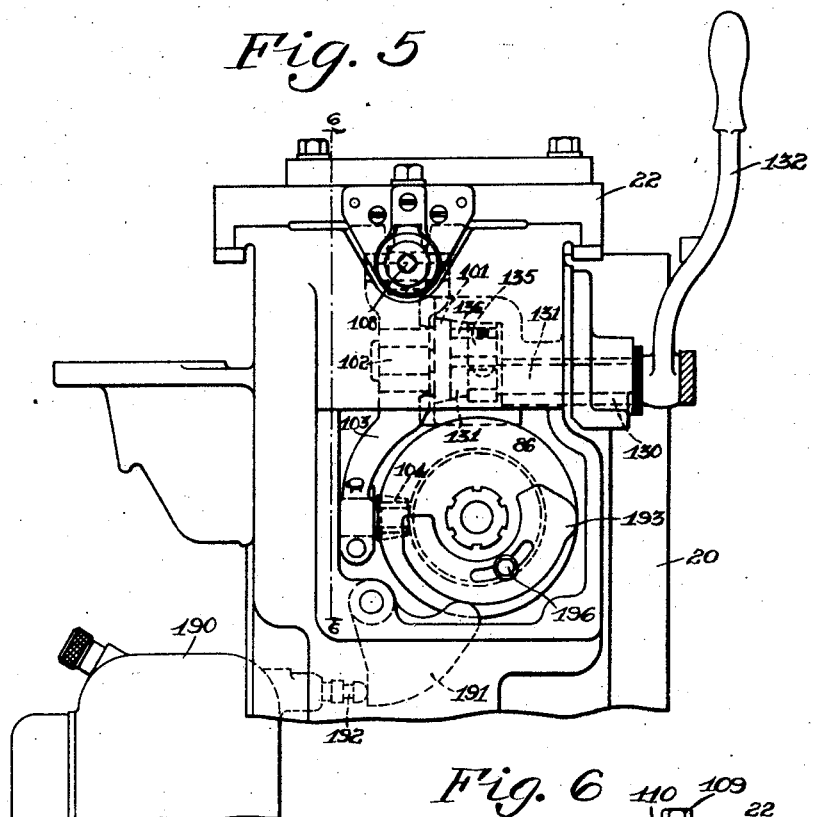

1,816,375

UNITED STATES PATENT OFFICE

MAXWELL H. HILL, OF ROCHESTER, NEW YORK, ASSIGNOR TO GLEASON WORKS, OF ROCHESTER, NEW YORK, A CORPORATION OF NEW YORK

GEAR CUTTING MACHINE

Application filed September 19, 1929. Serial No. 393,820.

The present invention relates to machines for producing gears and particularly to machines for generating spiral bevel gears.

The purpose of this invention is to provide at a minimum cost a very compact and efficient machine for cutting bevel gears of very small sizes. To this end, various improvements have been provided including a compact drive for the cutter spindle using a minimum number of gears, a quick throwout mechanism to permit moving the cutter clear of the work instantaneously for loading and a simple device for gauging the cutter settings.

The invention includes a number of other meritorious features as will appear hereinafter from the specification and will be pointed out in the appended claims.

In the drawings:

Figure 5 is a fragmentary end elevation of the base or frame of the machine, viewed from the end opposite to that shown in Figure 1;

Figure 6 is a section on the line 6—6 of Figure 5;

Figure 7 is a detail sectional view taken on the line 7—7 of Figure 1;

Figure 8 is a detail view of the brake for the cutter drive spindle and the means for operating the same;

Figure 9 is a detail view of the operating hand lever of the quick throw-out mechanism and associated parts;

Figures 10 and 11 are a side elevation and a plan view, respectively, of the cutter gauge;

Figure 12 is a view of one of the doors in the base of the machine showing how this has been utilized to store extra change gears.

Figure 1:
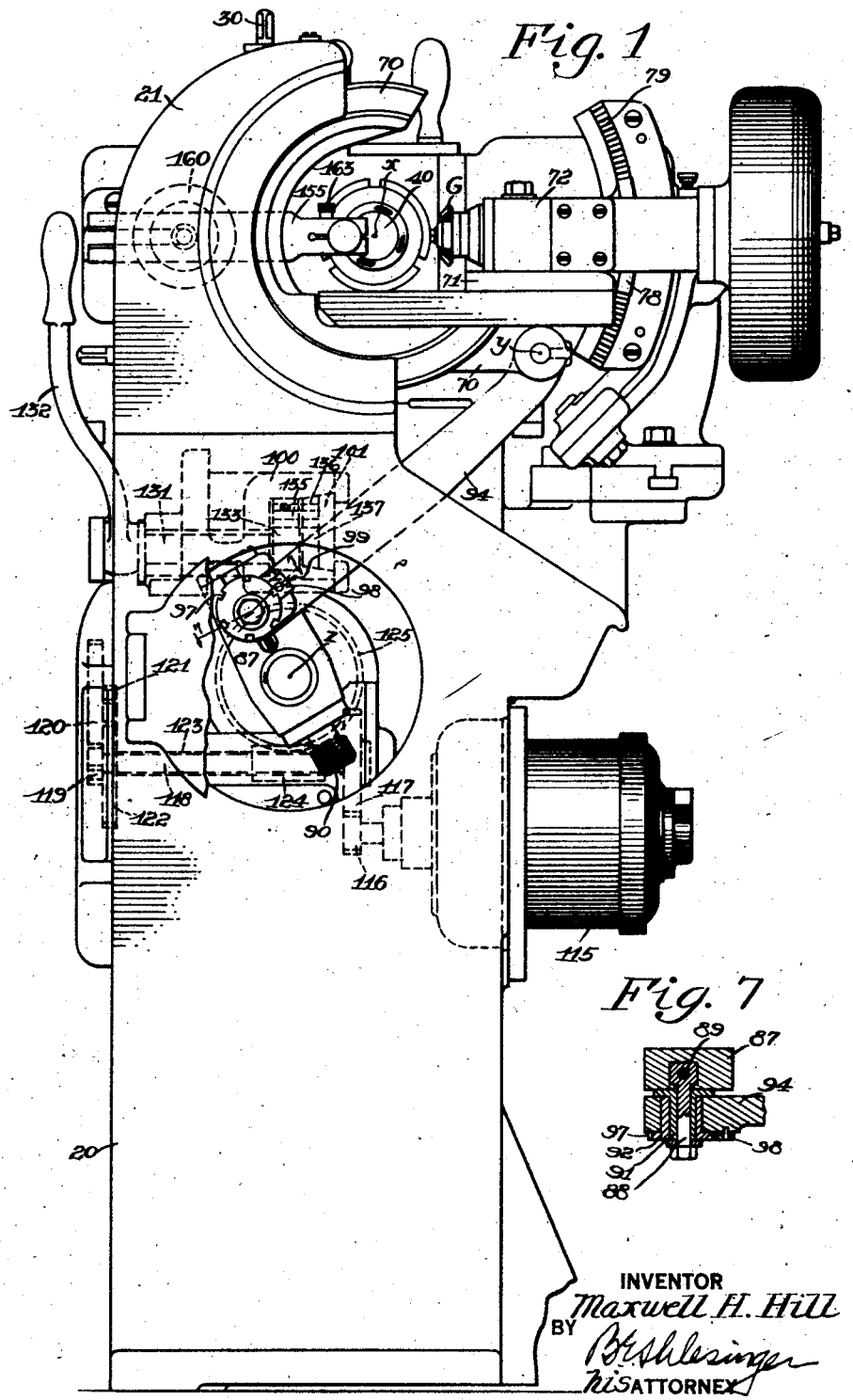
Figure 1 is an end elevation and Figure 2 is a side elevation of a machine constructed according to a preferred embodiment of this invention.

Referring to the drawings by numerals of reference, 20 indicates the base or frame of the machine. This base or frame 20 serves as a support for the upright 21 and the slide 22. The slide 22 carries the tool mechanism and the upright 21 supports the cradle on which the work head is mounted. The tool mechanism will be described first.

Mounted for lateral adustment on the slide 22 is a plate 23 forming the foot portion of a column 24. The direction of adjustment of the column on the slide 22 is at right angles to the direction of movement of the slide itself on the frame 20, a movement which will be described more particularly hereinafter.

Mounted on the column 24 for vertical adjustment thereon is a plate 25. This plate 25 is secured in any adjusted position on the column 24 by means of bolts 27, screws 28 and gibs 29. It is adjusted by means of a screw and nut (not shown). The upper end of the adjusting screw shaft is indicated at 30 in the figures and the adjustment can be made very accurately by means of a dial indicator, indicated at 31.

Figure 2:
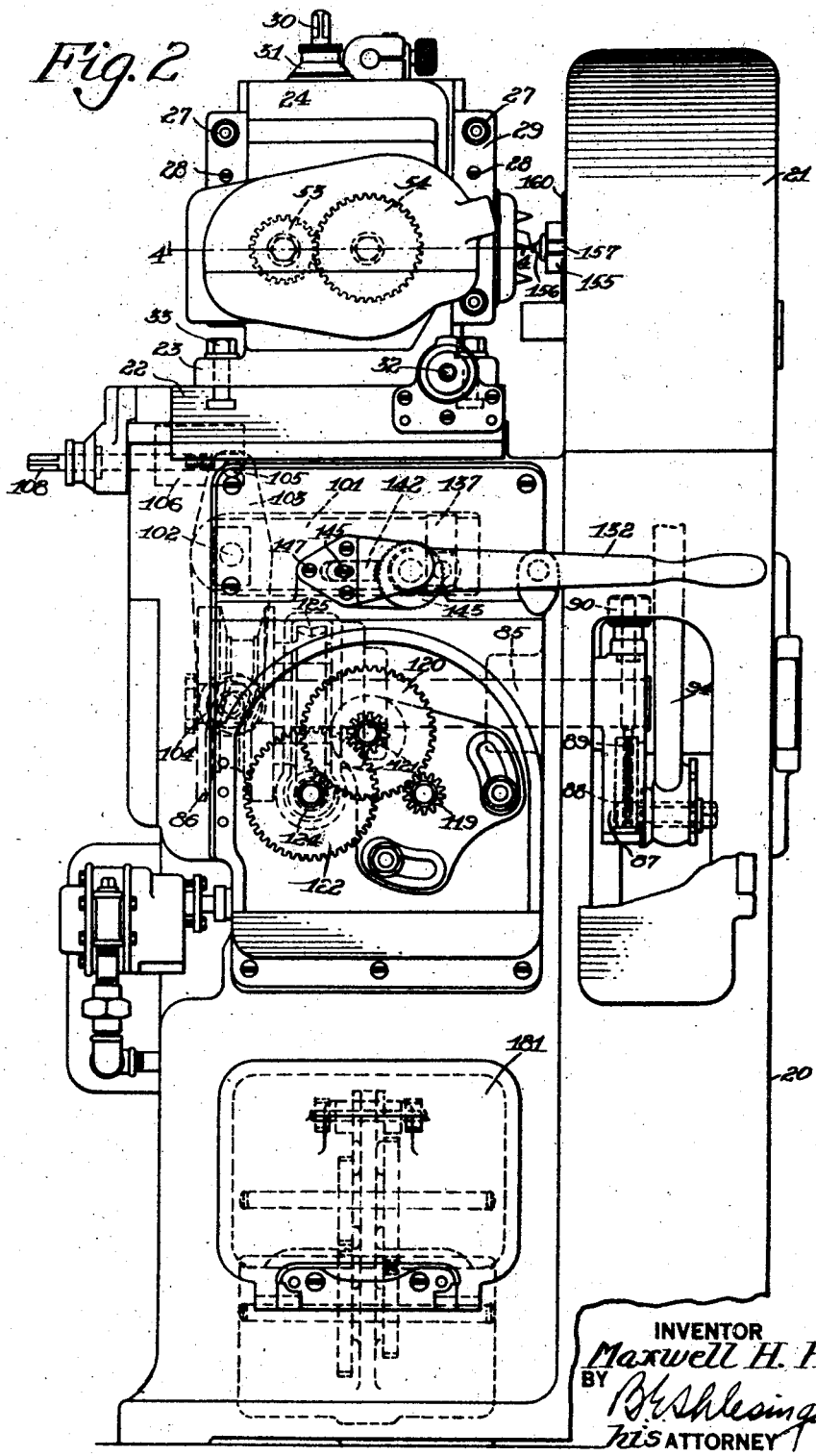
Figure 3:
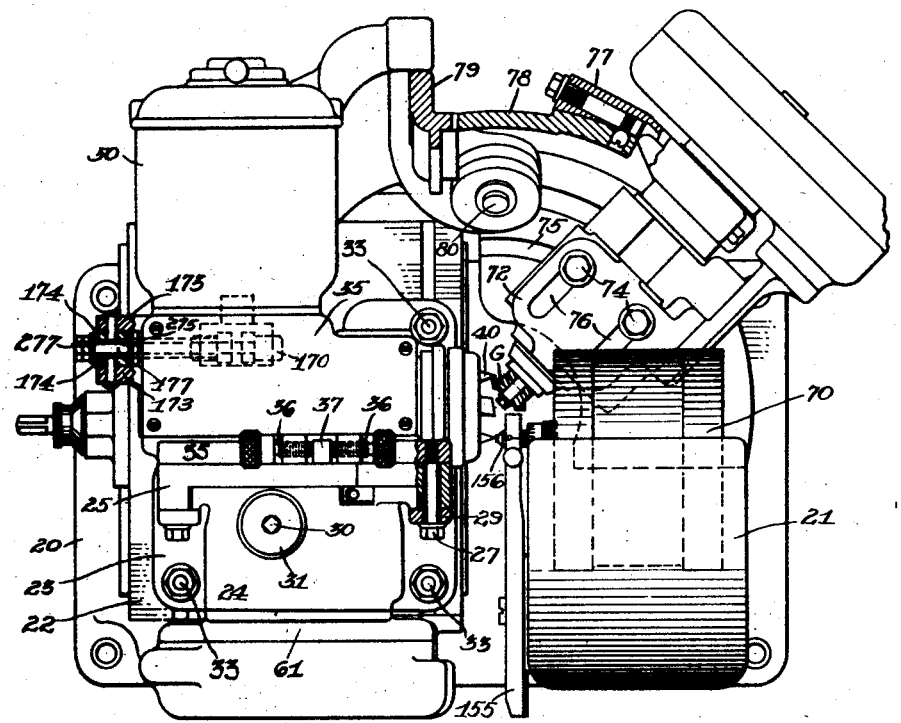
Figure 3 is a plan view of this machine on a slightly reduced scale.
Figure 4:
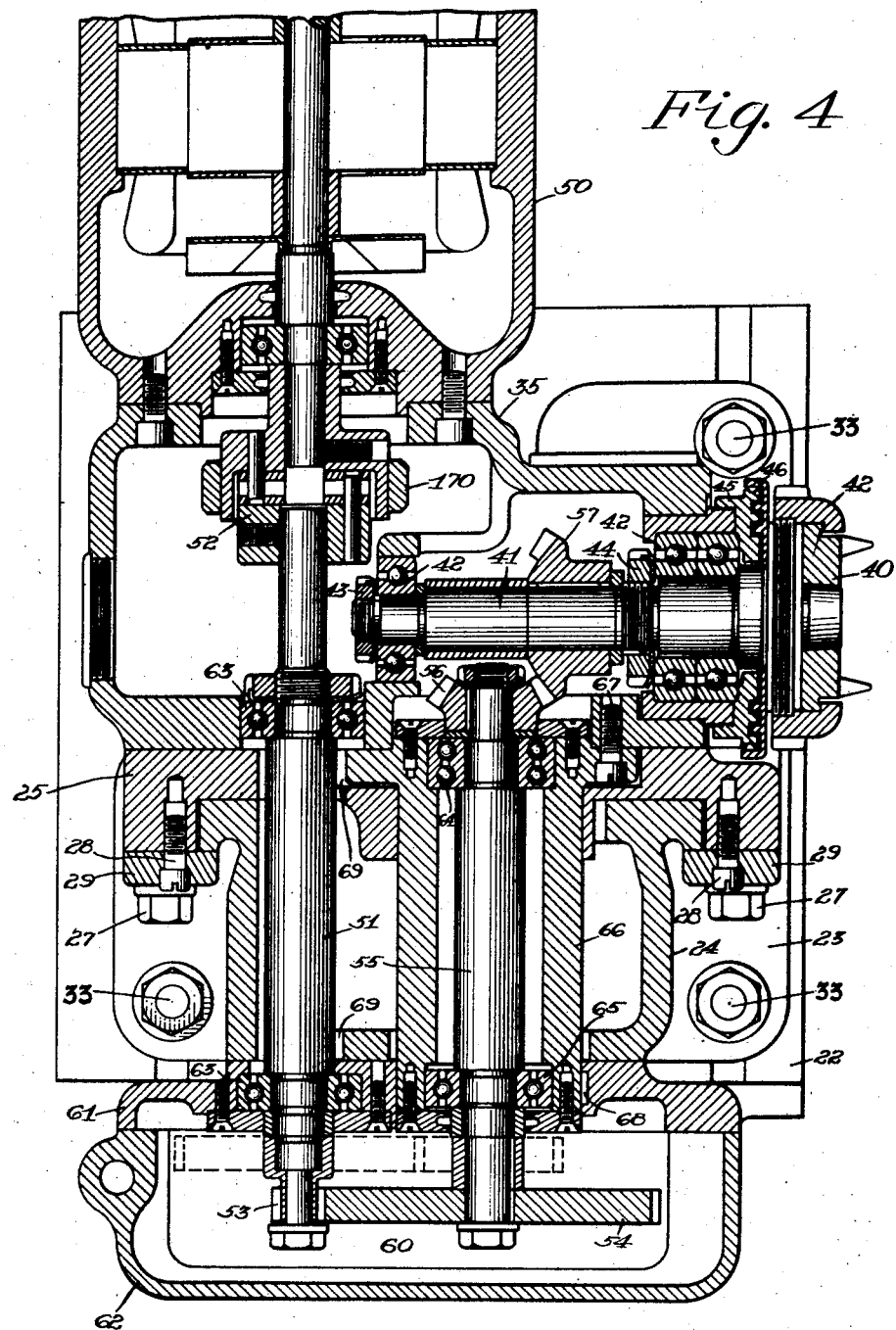
Figure 4 is a section taken generally on the line 4—4 of Figure 2 showing the construction of the tool head and the drive to the tool spindle.

The column 24 is adjusted on the slide 22 also by means of a screw and nut (not shown), the accuracy of the adjustment being controlled by a dial indicator designated at 32 (Figure 2). The column can be secured in any adjusted position on the slide by means of T-bolts 33, the heads of which engage in T-slots formed in the slide.

Mounted on the plate 25 and angularly adjustable thereon is a saddle 35. The angular adjustment of the saddle 35 is effected by means of the opposed screws 36, the inner opposed ends of which engage a lug 37 formed on the plate 25. The saddle 35 is held in any adjusted position by means of the bolts 27. These pass through aligned slots formed in the gibs 28 and the plate 25 and thread into the saddle.

The machine illustrated employs a rotary face-mill cutter and the cutter spindle is journaled in the saddle 35.

The three adjustments already described are old in machines of the character to which the present invention relates. The horizontal adjustment of the column 24 on the slide 22 and the vertical adjustment of the plate 25 on the column 24 are employed to set the cutter as required to cut gears of different spiral angles and different hands. The angular adjustment of the saddle 35 on the plate 25 permits of using one cutter to cover a slight range of jobs which would otherwise require several different cutters and it also enables slight changes to be made quickly in the tooth bearing of the gear cut.

One of the features of the present machine is a compact cutter drive. For cutting gears of small sizes a face-mill cutter is ordinarily used, which has its cutting blades integral with the cutter head. A cutter of this type is shown in the drawings at 40. It is secured to the cutter spindle 21 by means of a clamping nut 42 that threads onto the nose of the spindle 41. The spindle 41 is journaled in anti-friction bearings 42. The usual clamps and adjustments are provided for these bearings by means of nuts 43, 44 and 45, and the usual labyrinth seal is provided at 46 to keep grit and foreign particles out of the bearings. The cutter spindle 41 is driven from the motor 50 which is mounted on the cutter saddle 35, through the shaft 51 which is coupled to the armature shaft of the motor by any suitable form of coupling, designated at 52, the speed change gears 53 and 54, the shaft 55, and the bevel gears 56 and 57.

60 designates a change-gear housing formed by the back-plate 61 and a hinged cover 62. The shaft 51 is journaled in antifriction bearings 63 in the saddle 35 and in the change-gear housing back-plate 61. The shaft 55 is journaled in antifriction bearings 64 and 65 in a sleeve 66 which is journaled in the plate 25 and is secured at one end by means of screws 67 to the saddle 35 and is keyed at its other end as at 68 to the back-plate 61.

The angular adjustment of the saddle 35 is about the axis of the shaft 55 and of the sleeve 66 which is coaxial with said shaft. In this angular adjustment, therefore, the shaft 51 moves angularly about the shaft 55. The change gear housing 60 partakes of this angular adjustment because it is connected with the saddle 35 by the sleeve 66. The slots 69 in the plate 25 and the column 24 through which the shaft 51 passes are made of sufficient width to permit of the required angular movement of the shaft 51 in this adjustment.

The upright 21 referred to above is provided with ways for the oscillatory cradle 70. The cradle carries the work head carrier 71 and the work head carrier carries the work head 72. The work head carrier and work head may be of any suitable construction. They are preferably made, according to the form described in pending application Serial No. 394,350, filed September 21, 1929, in which the present inventor is one of the joint applicants. The work head carrier 71 is adjustable angularly on the cradle to set the blank to the correct root angle and the work head is adjustable on the work head carrier in the direction of the axis of the work spindle in order to set the blank to the correct cone distance. These adjustments may be effected manually or in any other suitable manner. The work head carrier may be secured in any adjusted position on the cradle and the work head in any adjusted position on the work head carrier by means of the bolts 74, these bolts engaging in the arcuate T-slot 75 formed on the upper face of the cradle and passing through the elongated slots 76 formed in the work head.

The work spindle, on which the gear blank G to be cut is secured, is mounted in the work head in any suitable way.

Through any suitable connection, forming no part of the present invention, the work spindle may be connected to the segment arm 7 which carries a radially adjustable segment 78 that meshes with and rolls on a pivotally mounted crown gear segment 79. The crown gear segment 79 is pivoted at 80 to a fixed part of the frame and may be of the same general construction described in the pending application of Eyvind Finsen, Serial No. 312,173, filed October 12th, 1928. The two segments may be held resiliently in mesh by means similar to that described in said application.

The indexing mechanism for the work spindle may be of any desired type, as, for instance, that described in pending application No. 394,350 above mentioned.

In the operation of the present machine, the cutter is rotated continuously from the motor 50 through the gearing already described, the slide 22 is moved alternately toward and from the work to feed the cutter into the blank to cut to the desired depth and to withdraw the tool from engagement with the blank to permit indexing. During these movements, the cradle is oscillated, and through the connection of the work spindle with the segment 78, the work spindle itself is oscillated by the rolling motion of the segment 78 on the crown gear segment 79. The oscillation of the cradle combined with the oscillation of the work spindle produces the generating roll and effects the indexing of the blank.

The mechanism for effecting the oscillation of the cradle and the feed and withdrawal movements of the slide 22 will now be described. Journaled in the base or frame of the machine is a shaft 85. Secured to this shaft adjacent one end is a cam 86 and secured to the shaft at its other end is a crank 87.

The crank 87 carries a pin 88 which is adjustable in the usual manner to vary the throw by means of a screw 89, operated by knurled nut 90. The pin 88 is mounted in a bushing 91 which is in turn mounted in an eccentric bushing 92. The connecting rod 94 is journaled on the eccentric bushing 92 and is pivotally connected at its upper end to the cradle 70.

The axis $x$ of the cradle, the center $y$ of the pivotal connection of the rod 92 with the cradle and the center $z$ of the crank shaft 85, are preferably, so related to each other that at the center of the roll of the cradle a line drawn radially of the axis $x$ of the cradle passing through the point $y$ is substantially perpendicular to a line connecting the point $y$ with the axis $z$. This construction is preferred because, with the eccentric set at zero, substantially the same amount of roll is obtained above and below center for any throw of the crank. When it is desired to secure a greater or less roll above than below center, the eccentric bushing 92 is adjusted. The bushing is provided with peripheral notches 97 and can be locked in any adjusted position by means of the dog 98 which is adapted to engage with any of these notches and which can be secured to the connecting rod 94 by means of a screw 99.

Mounted for movement in a guide 100 secured to or formed integral with the base or frame of the machine is a slide 101. Pivotally connected with this slide through an ordinary pin and block connection as at 102, is a lever 103. This lever 103 carries at its lower end a roller or follower 104 which engages in the track-way of the feed cam 86. At its upper end, the lever 103 is pivotally connected at 105 to a block 106. The block 106 is adjustable with reference to the slide 22 by means of a screw 108 and is secured to the slide 22 in any position of this adjustment by means of the bolt 109 which passes through an elongated slot 110 formed in the slide 22.

The shaft 85 is driven from the motor 115 through the gears 116 and 117, the shaft 118, the feed change gears 119, 120, 121 and 122, the shaft 123, the worm 124 and the worm wheel 125 which is secured to the shaft 85. It will be seen that as the shaft 85 rotates, the crank 87 will be rotated to oscillate the cradle 70 and impart a generating motion to the blank and that the feed cam 86 will be rotated to oscillate the lever 103 about the point 102 of its pivotal connection with the slide 101, thus imparting an alternate movement of the slide 22 and the tool mechanism carried thereby toward and from the work to feed the cutter alternately into depth and withdraw it for indexing.

The alternate cutting and indexing proceed until all of the teeth have been generated in the blank. The finished gear is then removed from the work spindle and a new blank can be affixed thereto. To take off the finished gear and chuck a new blank it is necessary to move the cutter and work further apart than happens in the intermittent withdrawal movement of the slide 22 under actuation of the lever 103. One of the features of the present invention is the quick throw-out mechanism provided for moving the cutter away from the work to loading position and returning it into operating position. This mechanism will be described now.

Mounted in the bushing 130 carried in the base of the machine is a shaft 131 which is adapted to be rotated by the hand-lever 132. Connected to the shaft 131 at its inner end is a crank arm 133. This carries the crank pin 135 to which is secured the block 136 which is adapted to travel in the slot 137 formed in the slide 101. When the lever 132 is moved, it will be seen that the slide 101 will be moved, moving the pivot point 102 of the lever 103 bodily and causing the lever to pivot about the roller 104. Thus by movement of the hand lever 132, the slide 22 and the tool mechanism carried thereby can be quickly moved away from the work a sufficient distance to permit taking off the completed gear and chucking a new blank. When this has been done, the tool mechanism can be returned to operating position by reversing the movement of the lever 132.

When the lever 132 is in horizontal position, shown in Figures 2 and 9, the tool mechanism is in operative relation with the work. When the lever is turned to the vertical position shown in Figures 1 and 5, the tool mechanism will have been moved away for loading. The lever 132 is releasably secured in horizontal position during cutting and indexing by means of a spring-pressed plunger 138 which is adapted to engage a recess formed in the lug 139 which is integral with the lever 132. Lever arm 133 when in horizontal position is on dead center.

The bushing 130 is an eccentric bushing and it is adjustable to permit taking up wear in the operating parts of the quick throw-out mechanism and in the fulcrum of the lever 103 or in the roller 104. The eccentric bushing 130 is secured in any adjusted position by means of the dog 142 which is toothed to engage the teeth formed on the periphery of the collar 143 which is formed integral with the bushing 130. The dog 142 is secured to the keeper 144 by means of the screw 145 which passes through the slot 146 in the keeper. The keeper is secured to the base or frame of the machine by screws 147. A screw 149 which threads into the frame 20 serves to limit the inward movement of the slide 101. The eccentric bushing 130 and the set-screw 149 are so adjusted that the roller 104 is under a slight load against one side of the track of the cam 86. When there is any wear in the operating parts, by adjusting the bushing 130 or the bushing and the set-screw, this wear can be taken up.

To adjust the cutter for axial position initially or after it has been sharpened or when its axial adjustment has been changed through tilting of the saddle 35, a cutter setting gauge is provided. This gauge comprises a bar 155 and a contact member 156. The bar is forked at one end to engage the stud 157 which is held by a spring (not shown) in the plate or button 160 that is secured by means of the screws 161 to the upright 21. The bar is provided with a guide portion 158 on its rear face which is adapted to engage in the slot 159 formed in the plate or button 160. The contact member 156 threads into the bar 155 and can be clamped in any adjusted position by means of the screw 163, the bar being slotted at 164 to permit of the clamping action. The guide slot 159 in the button 160 is horizontal so that the contact member engages the tip of a blade of a cutter 40 always on the horizontal center line of the machine. The knurled tip 165 of the contact member 156 is graduated to permit setting the contact member for any desired advance or withdrawal of the cutter beyond the center line of the machine.

The actual adjustment of the cutter axially is made by the screw 108 which serves to adjust the slide 22 with reference to the block 106. The bolt 109 is, of course, released before this adjustment is made.

A brake is provided on the drive shaft 51 of the tool mechanism. This brake 170 is of the split contracting type. It acts upon the periphery of the coupling 52, and is mounted on the stud 171 which is secured in the saddle 35. It is actuated to brake the drive spindle 51 by means of a hand lever 172. This lever which is forked to straddle the rod 177 is pivoted between the ears 173 formed on the saddle 35 and is provided on each furcation with a cam portion 174. When the lever 172 is moved in either direction from the position shown in Figure 8, it will be seen that the cam portions 174 engage the flange 275 of the sleeve 175 and the flange 277 of the rod 177 thus moving the sleeve 175 which operates on the arm 176 of the brake in one direction and pulling the rod 177 which is pinned at 178 to the other arm 179 of the brake in the opposite direction, thus contracting the brake about the coupling 52. This brake is used to shorten the coast of the cutter spindle after the machine has been stopped so as to allow removal of the work without danger to the operator and also to hold the cutter spindle against rotation when a cutter is being removed from or secured to this spindle.

A number of extra speed and feed change gears are furnished with the machine to permit employing different cutter speeds and cutting gears at different rates of speed. An ingenious arrangement is provided in the present machine for storing these extra change gears. An opening is cut into one of the side walls of the base of the machine, as indicated at 180 in Figure 12, and a pivoted door 181 is provided to close this opening. The door 181 is formed with a shelving extension 182 which when the door is closed projects into the hollow space between the walls of the machine. A central rib 183 is formed on the back of the door and its extension. This rib supports three rods 185, which project both ways from the rib 183. The projecting ends of these rods 185 are adapted to carry the extra change gears. The tips of the rods can be headed or split to provide means for holding the gears on the rods. The extension 182 is so formed that the door will have a substantially balanced movement about its hinge-pin 187 so that the operator can swing it easily about said hinge-pin. The peripheral flange 188 formed about the edge of the door acts as a stop to limit the movement of the door in one direction and the outer end of the extension 182 acts to limit the movement of the door in the opposite direction. A handhold is provided at 189.

The machine is stopped automatically when the gear being cut has been finished by an automatic stop 190. This may be of any suitable character, that shown being of the type described in the Patent No. 1,577,121 granted to the present inventor March 16, 1926. This stop is set for the number of teeth to be cut in the gear. It is ratcheted forward by a swinging member 191 which engages the stop-plunger 19 and which is actuated by the cam member 193 that is adjustably secured to the feed cam 86 by means of a bolt 196.

In each revolution of the cam shaft 85, an oscillating motion is imparted to the cradle 70 and the slide 22 is reciprocated to feed the tool into depth and withdraw it again for indexing and the stop 190 is advanced a notch by the swinging member 191. When the final tooth has been cut, the stop 190 trips to stop the motors 50 and 115 through suitable electrical connections therewith. The operator can then swing the lever 132 upwardly to withdraw the cutter to take off the finished gear.

While the invention has been described in connection with a machine for producing spiral bevel gears, it will be understood that certain features of the invention are capable of other uses. It will be understood that the present application is intended to cover any variations, uses, or adaptations of the invention following, in general, the principles of the invention and including such departures from present disclosure as come within known or customary practice in the art to which it pertains and as may be applied to the essential features hereinbefore set forth and as fall within the scope of the invention or the limits of the appended claims.

Having thus described my invention, what I claim is:

1. In a gear cutting machine, the combination with a work support and a tool mechanism, one movable toward and from the other alternately for feeding and indexing, of a pivoted lever operatively connected to the movable part, means for oscillating said lever to effect said movement and means for changing the position of the pivot point of said lever to effect withdrawal of the movable part to inoperative position to permit removal of the completed gear.

2. In a gear cutting machine, the combination with a gear blank support and a tool mechanism, one movable toward and from the other for alternate feeding and indexing, of a pivoted lever operatively connected to the movable part, means for oscillating said lever to effect said movement and manually operable means for changing the position of the pivot point of said lever to effect withdrawal of said movable part to inoperative position to permit removal of the completed gear.

3. In a gear cutting machine, the combination with a work support and a tool mechanism, one movable toward and from the other alternately for feeding and indexing, of a pivoted lever operatively connected to the movable part, means for oscillating said lever to effect said movement, a slide on which said lever is pivoted, a crank for moving said slide to change the position of the pivot point of said lever to effect withdrawal of said movable part to loading position, and means releasably holding said crank against movement during cutting.

4. In a gear cutting machine, the combination with a work support and a tool mechanism, one of which is movable toward and from the other alternately for feeding and indexing, a cam and a lever operated thereby controlling said movement, a slide, said lever being pivoted at one end to said movable part and carrying at its other end a follower which engages said cam and being pivoted intermediate its ends to said slide, and means for moving said slide to effect withdrawal of said movable part to loading position.

5. In a gear cutting machine, the combination with a work support and a tool mechanism, one of which is movable toward and from the other alternately for feeding and indexing, of a cam and a lever operated thereby controlling said movement, a slide, said lever being pivoted at one end to said movable part and carrying at its other end a follower which engages said cam and being pivoted intermediate its ends to said slide, a crank connected to said slide, a hand lever for operating said crank to move the slide to effect withdrawal of said movable part to loading position, and means for releasably holding said slide against movement.

6. In a gear cutting machine, the combination with a work support and a tool mechanism, one movable alternately toward and from the other for feeding and indexing, of a pivoted lever operatively connected to the movable part, means for oscillating said lever to effect said movement, a slide on which said lever is pivoted, means for moving said slide to shift the position of the pivot point of said lever to effect withdrawal of said movable part to loading position, and means for adjusting said slide to permit taking up wear in said parts.

7. In a gear cutting machine, the combination with a work support and a tool mechanism, one of which is movable alternately toward and from the other for feeding and indexing, and a frame on which said parts are mounted, of a pivoted lever operatively connected to the movable part, means for oscillating said lever to effect said movement, a slide movable on the frame on which said lever is pivoted, a crank for moving said slide to change the position of the pivot point of said lever and thereby effect withdrawal of said movable part to loading position, and means for adjusting the position of the crank shaft on the frame to take up wear in the operating parts.

8. In a gear cutting machine, the combination with a work support and a tool mechanism, one of which is alternately movable toward and from the other for feeding and indexing, and a frame on which said parts are mounted, of a pivoted lever operatively connected to the movable part, means for oscillating said lever to effect said movement, a slide movable on the frame on which said lever is pivoted, a crank for moving said slide to change the position of the pivot and thereby effect withdrawal of the movable part to loading position, and an eccentric bushing adjustable on the frame in which said crank shaft is journaled.

9. In a gear cutting machine, the combination with a work support and a tool support, one movable toward and from the other alternately for feeding and indexing in a direction perpendicular to the cutting plane, of a cam and a double-armed lever for controlling said movements, means for moving the pivot point of said lever in the direction of movement of the movable support to permit removal of a completed gear and chucking of a new blank, and means for releasably securing said last named means against movement when said movable support is in working position.

10. In a gear cutting machine, the combination with a work support and a tool support, one movable toward and from the other alternately for feeding and indexing in a direction perpendicular to the cutting plane, of a cam and double-armed lever for controlling said movements, a slide on which said lever is pivoted movable in the direction of movement of the movable support to permit removal of the completed gear and chucking of a new blank, and means for effecting said movement comprising a crank operatively connected to the slide, and a hand-lever for operating said crank.

11. In a gear cutting machine, the combination with a work support and a tool support, one movable toward and from the other alternately for feeding and indexing in a direction perpendicular to the cutting plane, of a cam and double-armed lever for controlling said movements, a slide on which said lever is pivoted movable in the direction of movement of the movable support to permit removal of the completed gear and chucking of a new blank, and means for effecting said movement comprising a shaft, a crank carried thereby and operatively connected to the slide, and a hand-lever for operating said crank, and an eccentric bushing in which the crank shaft is journaled, said bushing being rotatable for the purpose of adjusting the crank shaft in the direction of movement of the movable support.

12. In a gear cutting machine a cutter head, a cutter spindle and a drive spindle, both of said spindles being mounted in anti-friction bearings in said head, gearing connecting said drive spindle with said cutter spindle, and a manually operable brake operable on one of said shafts to permit holding the cutter spindle against rotation.

13. In a gear cutting machine, a cutter head, a cutter spindle and a drive spindle, both of which spindles are mounted in anti-friction bearings on the head, a face mill gear cutter, said cutter spindle having a threaded nose, a ring member adapted to be threaded onto said nose to hold the cutter on said spindle, gearing connecting said drive spindle with said cutter spindle, and a manually operable brake operable on one of said shafts to hold the cutter spindle against rotation.

14. In a gear cutting machine, the combination with a frame, a work support, a tool support, a tool mounted thereon, and means for adjusting the tool support toward and from the work support, of a gauge for setting said tool, comprising a part adapted to be mounted on the frame, a contact member adapted to engage the tip of said tool and adjustable means for determining the position of said contact member relative to the center line of the machine when it engages said tool.

15. In a gear cutting machine, the combination with a frame, a work support and a tool support mounted thereon, a rotary cutter spindle journaled in said tool support, an annular face mill secured to said spindle, and means for adjusting said cutter toward and from said work support, of means for gauging the axial position of said cutter relative to the center line of the machine comprising an arm adapted to engage a relatively fixed part of the machine, a contact member adapted to engage the tip surface of a blade of the cutter, and means for adjusting said contact member relative to the center line of the machine.

16. In a gear cutting machine, the combination with a frame, a work support and a tool support, a cradle on which one of said supports is mounted, a cutter spindle journaled in said tool support, and an annular face mill cutter secured to said spindle, said tool support being adjustable to set the tools to different spiral angles and adjustable angularly in a vertical plane and toward and from said work support, of means for gauging the axial position of said face mill cutter relative to the center line of the machine comprising a contact member adapted to engage the tip surface of a blade of the cutter, an arm carrying said contact member, a plate secured to the frame and means releasably securing said arm to said plate, said plate having a guide surface to center said arm so that the tip of said contact member lies in a horizontal plane containing the axis of the cradle.

17. In a gear cutting machine, a frame, a column adjustable horizontally on the frame, a plate adjustable vertically on the column at one side thereof, a change gear housing on the opposite side of the column, a saddle, a sleeve secured at one end to said saddle and at its other end to the change gear housing and passing through a slot in said column, a shaft journaled in said sleeve, a drive shaft, parallel to the first shaft and passing through aligned slots in said plate and column, change gearing housed in said housing and connecting said two shafts, a cutter spindle journaled in said saddle, a rotary face mill cutter secured thereto, and gearing connecting said first shaft and said spindle.

18. In a gear generating machine, the combination with a work support, a tool mechanism, a cradle upon which one of said supports is mounted, of a crank and a connecting rod for oscillating said cradle, said connecting rod being pivotally connected at one end to said crank and at its opposite end to the cradle, the point of its pivotal connection with the cradle being located so that a line drawn through said point radial of the cradle axis is substantially perpendicular to a line passing through said point and the center of the crank shaft.

19. In a gear generating machine, the combination with a work support and a tool mechanism, a cradle upon which one of said parts is mounted, a work spindle journaled in said work support, a segment having a fixed relation to the tool mechanism, and a segment connected to a work spindle and adapted to roll on the first segment, of a crank and a connecting rod for oscillating said cradle, said connecting rod being pivotally connected at one end to the crank and at its opposite end to the cradle, the point of this pivotal connection with the cradle being located so that a line drawn through this point radial of the cradle axis is perpendicular to a line passing through said point and the center of the crank shaft.

20. In a gear generating machine, the combination with a work support and a tool mechanism, and a cradle upon which one of such parts is mounted, a work spindle journaled in said work support, a segment having a fixed relation to the tool mechanism, a segment connected to the work spindle and adapted to roll on the first segment, of a crank, a stud adjustable radially of the axis of the crank, an eccentric sleeve rotatably adjustable on said stud, a connecting rod mounted at one end on said sleeve and pivotally connected at its opposite end to the cradle and means on said connecting rod for securing said eccentric sleeve in any position of its adjustment.

21. In a gear cutting machine, a column, a saddle at one side of said column and a change gear housing at the other side of said column, said saddle and change gear housing being connected together for simultaneous adjustment on said column, a drive shaft and a driven shaft mounted at opposite ends in said saddle and change gear housing and passing through said column, change gears in said housing operatively connecting said two shafts, a cutter spindle having a rotary face mill cutter mounted thereon journaled in said saddle and a pair of tapered gears operatively connecting said driven shaft and cutter spindle.

MAXWELL H. HILL.